(12) United States Patent
Deng et al.

(10) Patent No.: US 11,113,537 B2
(45) Date of Patent: Sep. 7, 2021

(54) IMAGE DETECTION USING MULTIPLE DETECTION PROCESSES

(71) Applicant: HULU, LLC, Santa Monica, CA (US)

(72) Inventors: Kaiwen Deng, Beijing (CN); Yunsheng Jiang, Beijing (CN); Xiaohui Xie, Beijing (CN)

(73) Assignee: HULU, LLC, Santa Monica, CA (US)

( * ) Notice: Subject to any disclaimer, the term of this patent is extended or adjusted under 35 U.S.C. 154(b) by 103 days.

(21) Appl. No.: 16/530,597

(22) Filed: Aug. 2, 2019

(65) Prior Publication Data

US 2021/0034878 A1 Feb. 4, 2021

(51) Int. Cl.
*G06K 9/00* (2006.01)
*G06K 9/62* (2006.01)
*G06K 9/46* (2006.01)

(52) U.S. Cl.
CPC ....... *G06K 9/00744* (2013.01); *G06K 9/4604* (2013.01); *G06K 9/6256* (2013.01); *G06K 9/6289* (2013.01)

(58) Field of Classification Search
CPC ............. G06K 9/00744; G06K 9/4604; G06K 9/6256; G06K 9/6289
See application file for complete search history.

(56) References Cited

U.S. PATENT DOCUMENTS

| | | | |
|---|---|---|---|
| 2016/0203388 A1* | 7/2016 | Li | G06T 7/73 386/241 |
| 2018/0084310 A1* | 3/2018 | Katz | G06N 3/08 |
| 2020/0005046 A1* | 1/2020 | Attorre | G06K 9/00718 |

\* cited by examiner

*Primary Examiner* — Xin Jia
(74) *Attorney, Agent, or Firm* — Fountainhead Law Group P.C.

(57) ABSTRACT

In some embodiments, a first detector generates a first output based on a first probability that an image was inserted in a video. The first detector is trained with a set of known images to detect the set of known images. A second detector generates a second output based on a second probability that an image was inserted in the video. The second detector is used to detect the set of unknown images without training. The method analyzes the first output from the first detector based on the probability of the image existing in the video and the second output from the second detector based on the probability of the image existing in the video to generate a combined score from the first output and the second output. An indication of whether the image is detected in the video is output based on the combined score.

20 Claims, 7 Drawing Sheets

IMAGE DETECTION USING MULTIPLE DETECTION PROCESSES

BACKGROUND

A video delivery system may receive videos from various content providers. Then, the video delivery system provides a library of videos that can be delivered to users. Various content providers may provide videos in different formats. For example, some of the videos may have logos that are inserted into the videos while some videos may not have the logo inserted in the video.

The video delivery system may want to detect logos that are found in videos. For example, logos may be burnt into the video, which may mean that the logos are included in a video that is received from a content provider. In some cases, the video delivery system may want to remove or mask the logo before delivering the video to users. In this case, the video delivery system needs to know which of the videos that are received from various content providers include logos.

Logo detection may be performed efficiently when the number of logos that exist within the videos is not large and variations of a logo are small. However, the video delivery system may receive a large amount of videos that may include a large amount of logos. Also, the same logo may be visually different in different frames of the same video or appear differently in different videos. Detecting the large amount of logos in the video and different variations may be time consuming when performed manually and hard to accurately perform automatically.

DETAILED DESCRIPTION

Described herein are techniques for an image detection system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

Some embodiments detect whether a video includes a type of image, such as a logo, using multiple detection processes. For example, a first detector may use a supervised network that is trained with a known set of logos. The first detector thus detects whether or not a video includes a logo that is similar to a known logo. However, the video delivery system may receive videos that include logos that may not be known due to a large number of videos that are received from different content providers, which may have new logos or logos that have been slightly changed. To supplement the first detector process, the video delivery system also includes a second detector that detects whether a logo exists in the video using an unsupervised approach that is not trained with a known set of logos. The second detector may detect whether a video includes a logo that is outside of the known set of logos. Accordingly, the video delivery system may perform the logo detection using both the first detector and the second detector.

The first detector may output a first output and the second detector may output a second output. The first output may be based on a probability of the logo existing in the video, and the second output may also be based on a probability of the logo existing in the video. The video delivery system may then generate a combined score that combines the first output and the second output. From the combined score, the video delivery system can output an indication of whether the logo exists in the video.

One reason for detecting whether a logo exists in a video is because the video delivery system may want to insert its own logo into a video or may insert a content provider's logo into the video. But if a logo is already burnt into the video (e.g., no matter what logo it is, how many logos are there, or where are the logos), then the video delivery system may not perform any logo insertion there may be potential risks of logos stacking together or logos of different networks being shown at the same time.

System

Figure 1:
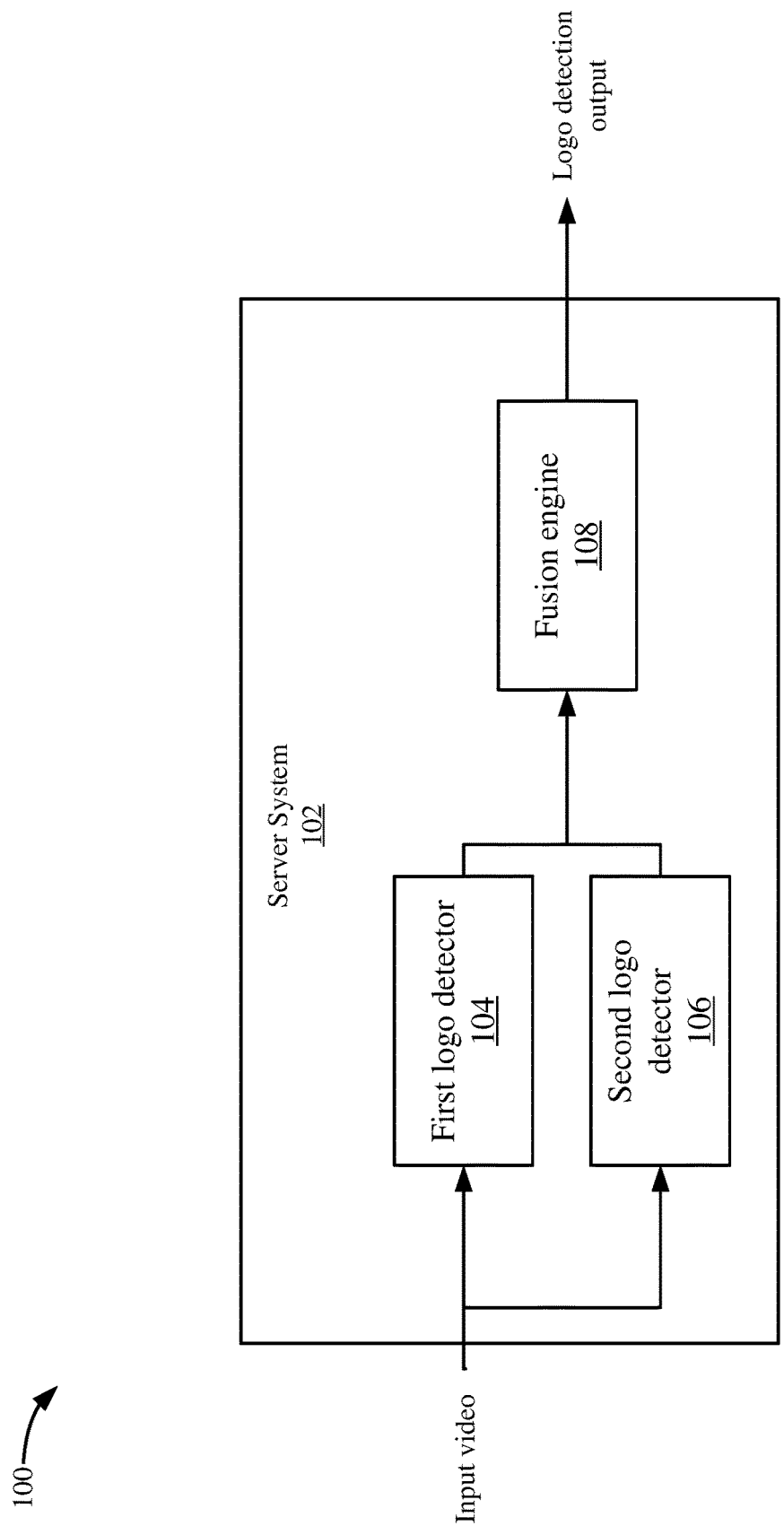
FIG. 1 depicts a simplified system for detecting logos in videos according to some embodiments.

FIG. 1 depicts a simplified system 100 for detecting logos in videos according to some embodiments. The term logo may be used, but a logo may be by definition, a visual representation of certain real-world entities. In some contexts, these entities may be various television (TV) networks, their corresponding channels, and other related entities. The form of a logo's presentation may be a type of image that is defined by certain rules, such as the image is included on multiple frames of the video in a similar location and substantially similar. Substantially similar may mean that the same image is included in the frames with only slight variations due to external factors, such as encoding losses or variations. The logo may have been added to the video after filming of the video. For example, the content for the video may have been captured using video cameras, such as a show may be captured by the video cameras. In post processing, the content provider or another entity may add the logo to the video in a subset of frames in a similar position.

A server system 102 may receive a video as input and then output a result for a logo detection process. In some embodiments, server system 102 may output a score, such as a score indicating whether a video includes a logo (e.g., a binary output of whether the video includes a logo or not). In other embodiments, server system 102 may output a probability that the video includes a logo. Also, server system 102 may output the position and frames where the logo is found within the video. Other outputs may also be appreciated, such as server system 102 may output a confidence level that indicates how confident server system 102 is that a logo has been detected.

Server system 102 includes a first logo detector 104 and a second logo detector 106. First logo detector 104 and second logo detector 106 may detect whether a video includes a logo. In some embodiments, first logo detector 104 may use a supervised detection approach such as a neural network where a known set of logos with labels is used to train first logo detector 104. The known set of logos include images that are known to be a logo if included in a video. In the training, the training set includes a known logo that may be included in frames in a video and a label for the respective frames that may indicate the video includes a logo and the positions of the logo. Other frames that do not include a known logo are also used in the training with labels that indicate the frames do not include a known logo.

Video frames with the known logos and video frames without the known logos are then input into first logo detector 104 during the training process. First logo detector 104 is trained to output a first output, which is compared to the respective labels. Based on the comparison, parameters of first logo detector 104 may be adjusted to adjust the performance of first logo detector 104. The training of first logo detector 104 will be described in more detail below.

Second logo detector 106 may perform a series of pre-defined operations, such as mathematical operations. The output of those operations are controlled by several adjustable parameters, which are adjusted to detect visual elements whose appearance and location within the frames do not evolve significantly over a number of frames. In some embodiments, the parameters of second logo detection 106 network are assigned, thus the second logo detector 106 does not need to be explicitly trained. Because second detector 106 is used to detect visually stationary elements, second logo detector 106 is able to detect logos that may be new or not known to the video delivery system. Second logo detector 106 may be able to detect known logos also, but may only be used to detect unknown logos.

First logo detector 104 outputs a first output based on its detection of logos in the video. In some embodiments, first logo detector 104 may output a score that is a probability the video includes a logo and also a location of the logo in the video. In some embodiments, the probability may be a video level score for the overall video and the location is the most probable location in the frames of the video. For example, the logo may be only found in one location in the video in a number of frames that are over a threshold and thus a single probability and single location may be used. In other embodiments, first logo detector 104 may output a video level score that indicates the logo may be found in the entire video by comparing the probability mentioned above to a threshold. Additionally, the video may include multiple logos that are in different locations, and first logo detector 104 may output a probability and location for each of the logos that are detected in the video.

Second logo detector 106 outputs a second output based on its detection of logos in the video. In some embodiments, second logo detector 106 may output a score that is a probability the video includes a logo and also a location of the logo in the video. In some embodiments, the probability may be a video level score for the overall video and the location is the most probable location in the frames of the video. Additionally, second logo detector 106 may identify multiple logos and also the location and frames in which the logos are detected. A fusion engine 108 may combine the first output and the second output together to generate a logo detection output. Fusion engine 108 may determine a logo exists in the video when the first output is above the threshold or the second output is above the threshold that indicates there is a logo in the video. In some embodiments, fusion engine 108 outputs a logo detection output that indicates whether or not a video includes a logo or not.

The following will describe first logo detector 104 and second logo detector 106 in more detail.

First Logo Detector

First logo detector 104 uses a supervised training approach that requires training samples. The training samples include a number of logos that are known. The known logos may be received from various sources, such as from a user, a company, etc. First logo detector 104 uses a supervised training approach that requires labels for the samples. That is, each video frame may be labeled as having a logo, or not having a logo. The label may also include a position indicating where the logo is in the video frame. It may be expensive and time-consuming to manually label existing video frames to generate the training samples. In some embodiments, an image of a logo may be inserted on clean video frames that do not include the logo to generate the desired training samples that include the logos. The challenge, however, is in guaranteeing a consistency between the synthesized training samples and real frames that may be included in the videos being analyzed.

Figure 2:
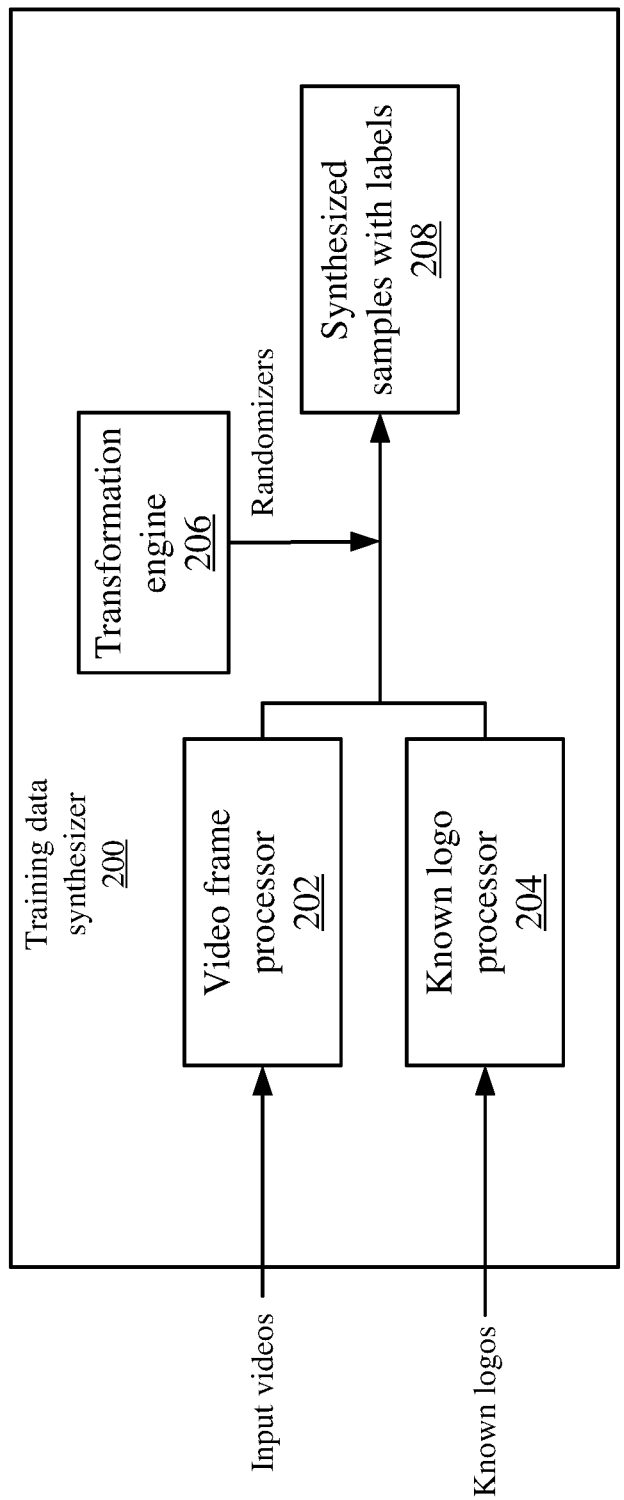
FIG. 2 depicts an example of a training data synthesizer to generate training samples according to some embodiments.

The following describes a method to generate the training samples, but other methods may be used. FIG. 2 depicts an example of a training data synthesizer 200 to generate training samples according to some embodiments. Training data synthesizer 200 may receive input videos and known logos. A video frame processor 202 may generate known clean video frames from the input videos. The clean video frames may be frames that do not include a logo in them. For example, the clean frames may be identified by using a video that is known to not have any logos in it. Then, video frame processor 202 may extract frames from the videos. Frames from different videos may be used to provide a diversity of frames with different content.

A known logo processor 204 receives known logos and can prepare the known logos for insertion in the clean video frames. For example, known logo processor 204 may receive just the images of the known logos. In other embodiments, known logo processor 204 may receive frames that include logos and may extract the logos out of the frames such that an image of the logo is retained.

Video frame processor 202 outputs the clean video frames and known logo processor 204 outputs images of the known logos. To guarantee consistency between the synthesized frames and the actual frames of the videos that may be analyzed, training data synthesizer 200 may perform a process to alter the clean video frames and/or known logos. For example, the logos may appear slightly different from the original form received at known logo processor 204 because the actual videos may be encoded in a lossy way and logos may appear differently in the actual videos. Also, the logo images may be transformed in random ways when inserted into the video frames that are being analyzed. To increase the robustness of the synthesized training samples, a transformation engine 206 may use local randomizers that transform the logo images that are inserted into the clean video frames or transformation engine 206 may transform the video frames after the logos are inserted into the video frames. The alterations may generate training samples that have a higher chance to be similar to actual frames with logos.

Although the following transformations are described, other transformations may be used. In some embodiments, transformation engine 206 may randomly apply one or more blur methods, such as a median blur, a bilateral blur, and a Gaussian blur. The median blur, bilateral blur, and Gaussian blur may blur the logo image differently. The median blur may use a median filter that is a non-linear digital filtering technique to remove noise from an image. The bilateral blur may use a bilateral filter that is a non-linear, edge-preserving, and noise-reducing smoothing filter for images. The Gaussian blur may blur an image using a Gaussian function. Other blurring methods may also be used.

Transformation engine 206 may also include randomly selecting blur parameters, such as a sigma value and a kernel size. The sigma value may be used in the Gaussian blur to determine the amount of blurring caused by the Gaussian function. The kernel size may use the Gaussian filter to determine the blurring applied to the logo.

Transformation engine 206 may also randomly set the logo position in the clean video frames. For example, transformation engine 206 may randomly set the logo position in the same frame multiple times or set the logos in different positions in different clean video frames.

Transformation engine 206 may also apply random photometric transformations, such as applying fluctuation upon the image's hue, saturation, and brightness. The photometric transformations may change the logo's color and appearance.

Transformation engine 206 may also apply geometric transformations, such as a random flip, translation, and scaling. These transformations may adjust the appearance of the logo by flipping the logo by a certain degree, moving the logo, and/or scaling the logo to a different size. Transformation engine 206 may also apply random transparency, which may adjust the transparency of the logo. Transformation engine 206 may also apply random pixelated red, green, blue (RGB) value fluctuation, which adjusts the RGB values of the logo.

The result of the transformations is synthesized samples with labels at 208. The samples may or may not include an inserted logo, and are labeled as either including a logo or not including a logo, and also labeled with a location of the logo. A logo that is randomly transformed may be transformed in multiple different ways on the same frame or on multiple different frames. Using the above method, training data synthesizer 200 may generate a large number of samples with labels.

Figure 3:
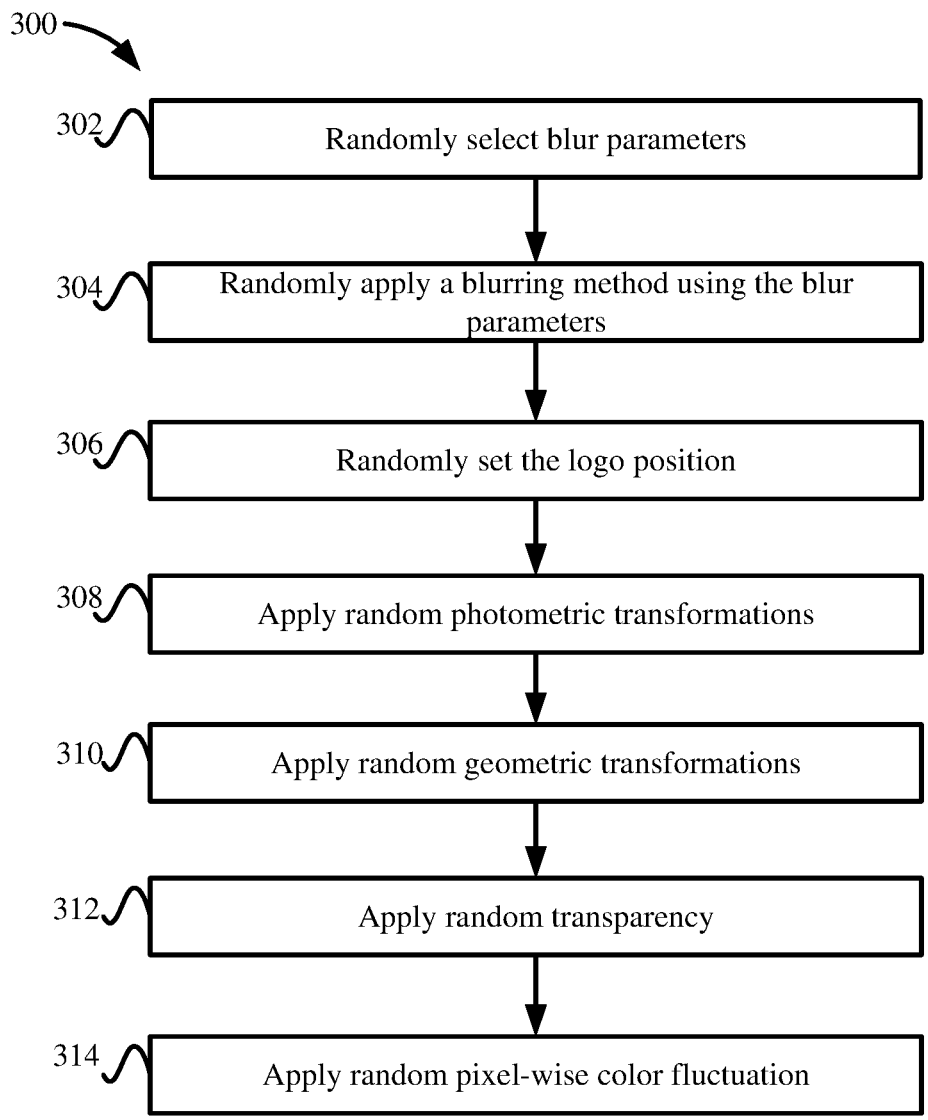
FIG. 3 depicts a simplified flowchart of a method for generating training samples according to some embodiments.

FIG. 3 depicts a simplified flowchart 300 of a method for generating training samples according to some embodiments. At 302, transformation engine 206 may randomly select blur parameters. At 304, transformation engine 206 may randomly apply a blurring method using the blur parameters. At 306, transformation engine 206 may randomly set the logo position. The logo position may be set in multiple different areas in a frame. At 308, transformation engine 206 may apply random photometric transformations. At 310, transformation engine 206 may apply random geometric transformations. At 312, transformation engine 206 may apply random transparency transformations. At 314, transformation engine 206 may apply random pixelated color fluctuation to the logo. Any number of the above transformations may be applied in any combination, or no transformations may be applied.

Once determining the training samples, first logo detector 104 is trained using the training samples with labels. Different training methods may be used. For example, the training samples may be input into first logo detector 104, which analyzes the training samples to generate a first output. The first output may be a probability that a frame includes a logo and a position of the logo. The first output of first logo detector 104 may then be compared with the labels for the training samples. For example, in a simplified example, first logo detector 104 may receive a frame that may include a logo or may not include a logo. First logo detector 104 may then output a probability of whether a logo is detected in a frame or not. The first output is compared to the label for the frame. Depending on the first output, parameters of first logo detector 104 are adjusted using logic, such as a loss function. For example, if the probability is high, then a label of no logo will result in altering the parameters of the first logo detector 104 to predict a lower probability. If the probability is low, then a label of no logo will result in possibly less alteration of the parameters of the first logo detector 104 because the lower probability indicated no logo was likely not found in the video frame. Eventually, the parameters of first logo detector 104 are adjusted to optimally detect whether logos in the training samples are included or not. It is noted that the training of first logo detector 104 may be performed once or multiple times.

Figure 4:
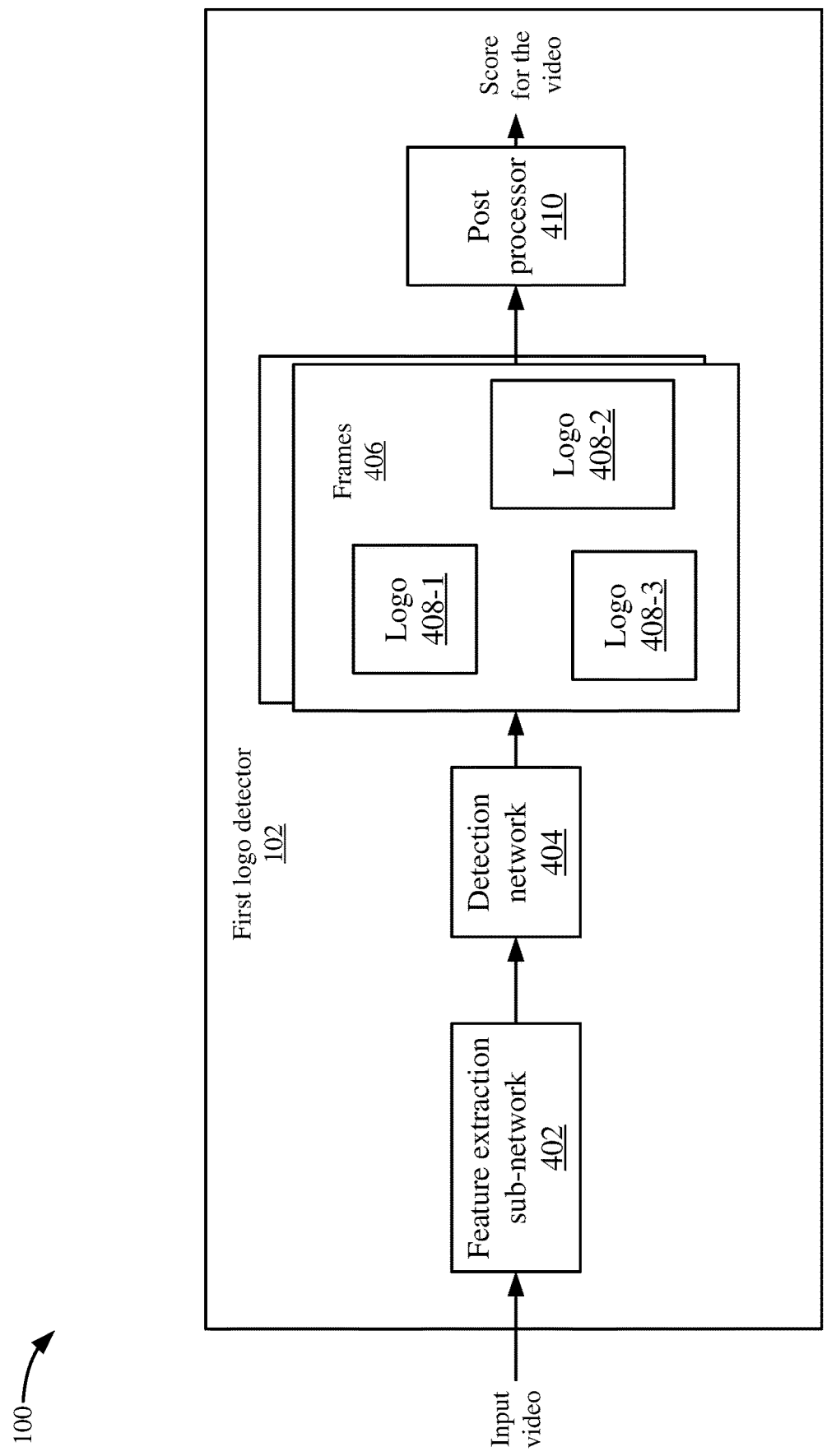
FIG. 4 depicts an example of a logo detector according to some embodiments.

Once first logo detector 104 is trained, then first logo detector 104 is used to analyze videos to determine if the videos include logos or not. FIG. 4 depicts an example of logo detector 104 according to some embodiments. A feature extraction sub-network 402 receives the input video and can extract frames from the video. In some embodiments, a number of frames are extracted from the input video for analysis. In some examples, not every frame may be used, but in other examples, all frames may be used. Because a logo may exist on multiple frames in a video, not every frame may be used and frames may be extracted at a rate higher than 1.0 frames/second. Additionally, some frames at the beginning and end of the video may be left out because these frames may not typically include the logo. In some embodiments, the extracted frames may be pre-processed, such as removing blur and enhancing the contrast before analysis to enhance the logo detection process. The pre-processing of the frames may alter the characteristics of the frame to allow first logo detector 104 detect the logo more accurately. For example, a frame with less blur may make it easier to detect a logo than a frame with blurry features.

Then, feature extraction sub-network 402 extracts features from the video. In some embodiments, feature extraction sub-network 402 extracts semantic high-level visual features from frames extracted from the input video. The semantic high-level visual features may be features that are directly associated with logos' typical visual patterns, and may be expressed as a multi-dimensional matrix that describes the features. In some embodiments, a spatial attention module and a squeeze and excitation module may be used. The spatial attention module may be designed to emphasize components of the features that are relevant to logos. The use of spatial attention module is to detect visual elements that differ from a background, which may be visual elements more likely to be logos. The squeeze and excitation module may be used to emphasize some components of the features as the special attention module also does. However, the difference is that the squeeze and excitation module emphasizes different axes of the feature (as mentioned above, the features are multi-dimensional matrix with multiple axes). In some embodiments, feature extraction sub-network 402 may include a number of convolutional layers that extract the features from a frame of the video.

A detector 404 then detects features in the image that may be associated with a known logo according to some embodiments. In some embodiments, a de-convolutional single-shot detector (DSSD) is configured to detect small-sized objects, which may be appropriate for the logos. The de-convolutional single-shot detector may be a neural network architecture that uses the extracted features from feature extraction sub-network 402 as input, and uses de-convolution operations to gradually increase the size of features to gain high detection resolution. Detector 404 outputs detection results 406, which may be a series of bounding box coordinates where logos may be located as well as the corresponding probability of the logos occurring in each frame extracted from input video. Detection results 406 may include one or more detection results of possible as suggested by logos 408-1 to 408-3 in one or more locations in one or more frames. Although three results are shown in three different locations in one frame, any number of logos may be detected including a single logo in a single location in multiple frames, as single logo in multiple locations in one frame, multiple logos in multiple locations in multiple frames, and other combinations.

A post-processor 410 may process detection results 406 to generate a video level score, which may be the probability that the video includes a known logo. Post-processor 410 may also determine the most probable location of the logo. For example, post-processor 410 may generate a heat map by mapping bounding box coordinates from frames 406 to the heat map into a single image. Then, post-processor 410 selects a location based on the heat map values, such as the location with the highest heat map value in the single image. Post-processor 410 then outputs the probability for that location as the score of the video. Some logos that are detected may not be the type of logos that server system 102 is trying to detect. For example, some content in the video may appear like a logo and is detected. However, these types of logos may only appear in a few frames and are not the type of logo that typically appears in a number of frames above a threshold.

First logo detector 104 may output a video level detection result, which may indicate whether the video includes a logo and the most probable location of the logo in the video. In some embodiments, only a single logo and its probability may be included in the result because a goal of the detection may only be to determine if a video includes a logo or not. For example, the single logo may be detected because a network may only insert a single logo for the network; it may be the goal of one type of detection if it is desired to know whether a logo already is burnt into a video. However, in other embodiments, first logo detector 104 may be attempting to detect multiple logos in the frames and multiple logos may be output with their associated probability.

Unsupervised Detection Process

Second logo detector 106 performs an unsupervised logo detection that can detect logos that are not previously known. For example, logos that are not included in the known logo set are detected. This may arise because the training samples of known logos may not cover all logos that may be included in videos received by the video delivery system. For example, some logos may be not known and synthesized in training samples by training data synthesizer 200, and thus cannot be detected by first logo detector 104. However, these types of logos may be detected by second logo detector 106. Additionally, videos may include new logos or existing logos may change or evolve over time. Second logo detector 106 is used to detect videos that may include logos outside of the known logo set. Second logo detector 106 may detect the logos by the characteristics of a logo, and not by using the appearance of known logos.

Figure 5:
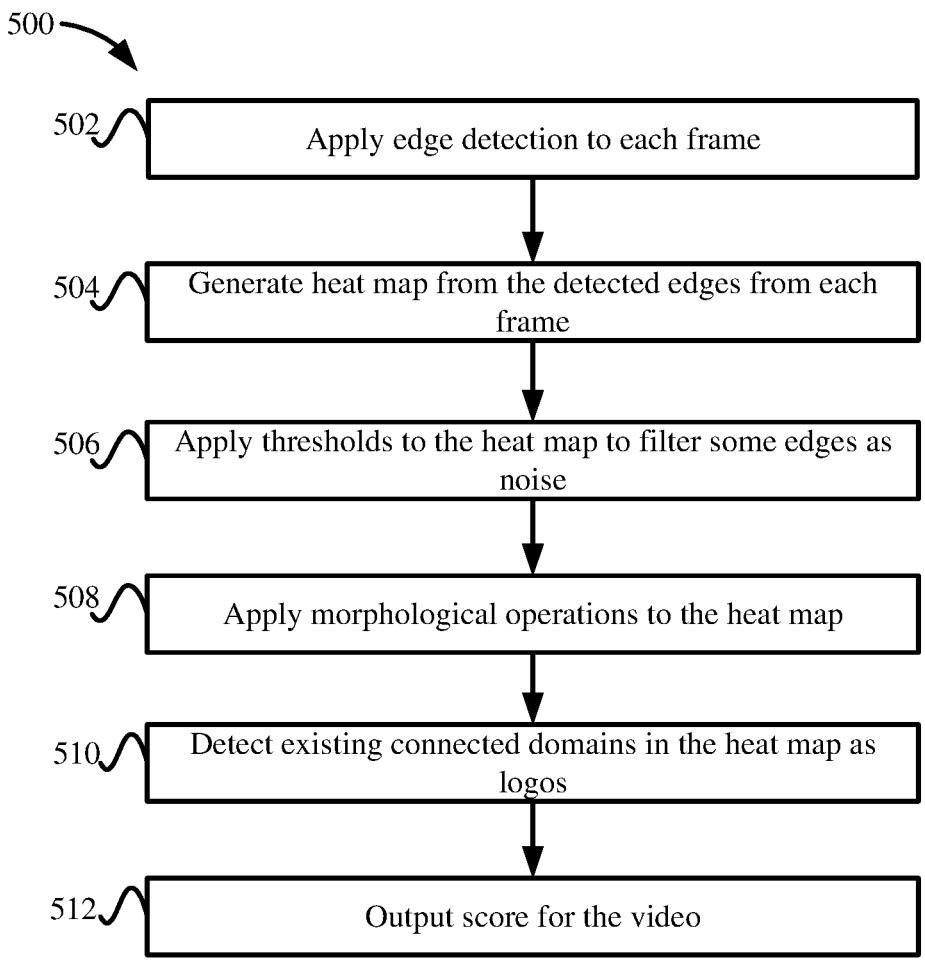
FIG. 5 depicts a simplified flowchart of a method for detecting logos using an unsupervised approach according to some embodiments.

FIG. 5 depicts a simplified flowchart 500 of a method for detecting logos using an unsupervised approach according to some embodiments. Although this approach is described, other unsupervised approaches may be used. At 502, second logo detector 106 applies edge detection to each frame of an input video. In some embodiments, second logo detector 106 receives the identical frames that were analyzed by first logo detector 104. Second logo detector 106 may detect the edges in each frame using different edge detection methods. For example, second logo detector 106 may have parameters that are set to detect edges in frames.

At 504, second logo detector 106 generates a heat map from the detected edges from each frame. The heat map may summarize where edges are detected and may be used to filter out some noise in the edge detection. That is, a logo may be expected to be in the same position in multiple frames, which may result in a higher heat map value. Some edges may be detected in only a small number of frames and thus include lowered heat map values. These edges may be considered noise and may not be a logo that is in the content of the video. Accordingly, at 506, second logo detector 106 applies a threshold to the heat map to filter some edges out of the heat map as noise. In some embodiments, the heat map value for edges is filtered out of the heat map when the value is below a threshold. Being below a threshold may indicate that the edges may not have been detected in enough frames such that the probability of the edges being part of a logo is low. The morphological operations may help to form a better representation of a logo for detection. The edges may be separate lines that can be connected for the representation.

At 508, second logo detector 106 may apply morphological operations to the heat map. The morphological operations may include closing, filling, and opening to edges the heat map, which may close the gaps in some edges, fill the gaps between some edges, and open gaps between some edges.

At 510, second logo detector 106 may detect existing connected domains in the heat map as logos. For example, second logo detector 106 may detect connected domains that may form a structure of characteristics of a logo. In some examples, the characteristics may be that the connected domain fills a certain size that is similar to the characteristics of a logo. Second logo detector 106 may also check the validity of the connected domains, such as whether its area and aspect ratio falls within predefined ranges.

At 512, second logo detector 106 then outputs the score for the video. In some embodiments, the score may be a probability that indicates how likely the video includes a logo. Second logo detector 106 may also output other types of scores, such as a binary value that represents whether or not the video includes a logo.

Fusion Engine

Once first logo detector 104 outputs a first output and second logo detector 106 outputs a second output, fusion engine 108 combines the first output and the second output together to determine the overall score for the video. In some embodiments, the first output and the second output are different. For example, first logo detector 104 is using a supervised approach and the first output is different from second logo detector 106, which is using an unsupervised detection approach. The outputs are different because the networks are detecting different characteristics in the video frames. For example, second logo detector 106 mainly detects edges inside video frames whereas first logo detector 104 detects visual patterns summarized from known logos.

Figure 6:
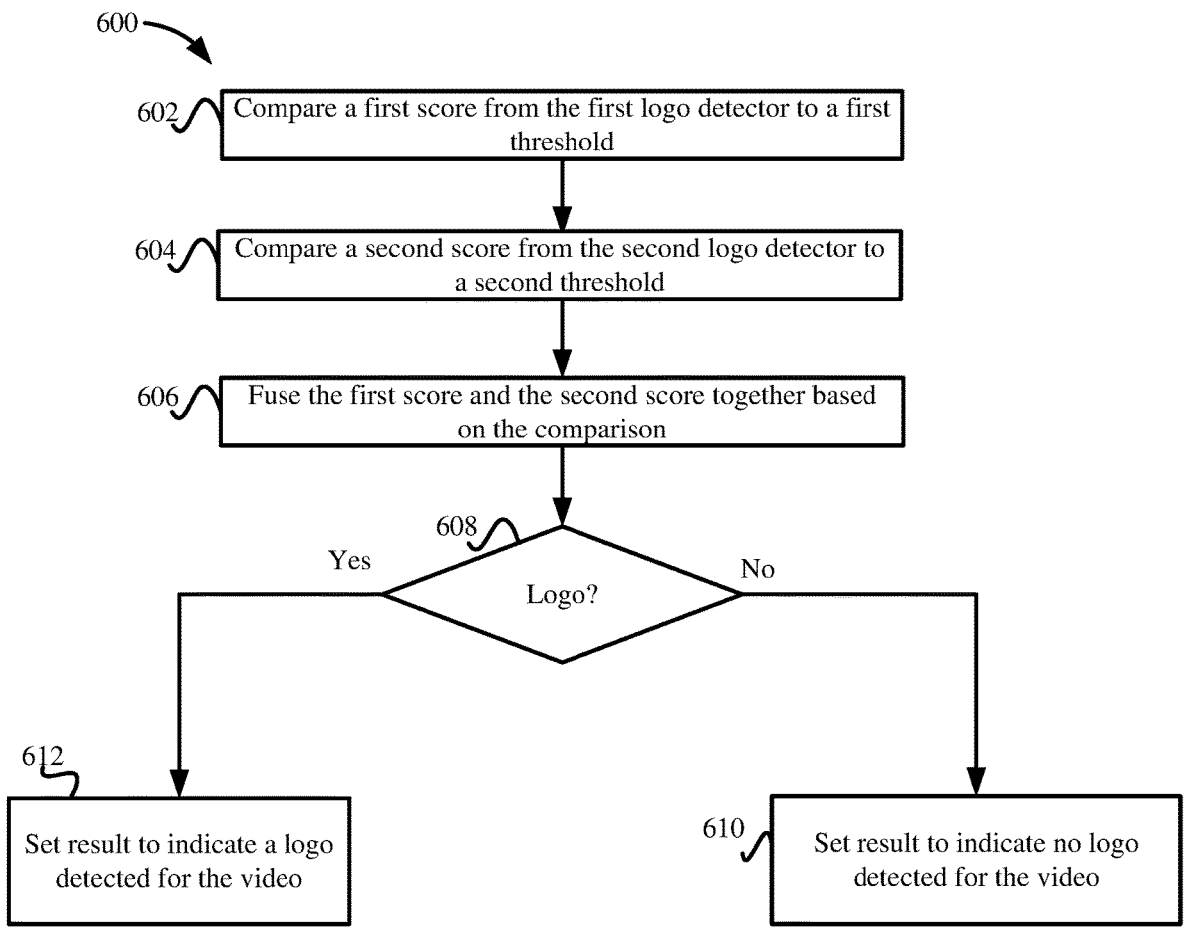
FIG. 6 depicts a simplified flowchart for fusing the scores according to some embodiments.

FIG. 6 depicts a simplified flowchart 600 for fusing the scores according to some embodiments. At 602, fusion engine 108 compares a first score from first logo detector 104 to a first threshold T1. The output of first logo detector 104 may be a probability that may be a floating number between the values of zero and one, but other ranges may be used. Because the value of the number between the range of zero and one indicates the probability that first logo detector 104 assigned to a logo existing in the video. In some embodiments, a higher number represents a higher probability that a logo exists in the video. Fusion engine 108 sets a threshold T1 to determine whether or not the output of first logo detector 104 indicates a logo exists in the video. The threshold T1 may be set such that a certain amount of confidence that a logo exists in a video is needed to indicate the logo exists in the video.

In some embodiments, second logo detector 106 outputs a probability that is a floating number between the values of zero and one, but other ranges may be used. The value of the number between the range of zero and one indicates the probability that second logo detector 106 assigned to a logo existing in the video where a higher value that is closer to one indicates it is more likely the video includes a logo. At 604, fusion engine 108 compares a second score to a second threshold T2 to determine whether or not the output of second logo detector 106 indicates a logo exists in the video. The threshold T2 may be set such that a certain amount of confidence that a logo exists in a video is needed to indicate the logo exists in the video.

At 606, fusion engine 108 fuses the first score and the second score together based on the comparison. For example, fusion engine 108 may determine whether the first score is greater than the threshold or the second score is greater than the threshold, which means that either first logo detector 104 and/or second logo detector 106 believe a logo existed in a video. At 608, fusion engine 108 determines whether or not a logo exists in the video. If it is determined that a logo does not exist in the video, at 610, fusion engine 108 sets a result to indicate no logo is detected for the video. If fusion engine 108 determines that a logo is detected in the video, at 612, fusion engine 108 sets a result to indicate that a logo is detected in the video. The fusing of both scores may reduce the risk of false negatives. The risk of false negatives is reduced because positive detection results from first detector 106 as well second detector 108 can both set the final detection results to positive. The consequences of not detecting that a logo is in a video when there is actually a logo in the video is more severe than detecting a logo when there is not a logo. In some examples, when a logo is not detected, a logo may be inserted into the video. If there is a pre-existing logo in the video, then it is possible that logos are stacked in the video. However, when it is detected that a logo exists when there is not a logo in actuality, the consequence is no logo is inserted in the video, which is not as a bad outcome as having stacked or multiple logos in the video. Also, the above logic also detects logos that may be unknown at a time because second logo detector 106 may detect some logos that first logo detector 104 does not.

Conclusion

Accordingly, a logo detection process is provided with multiple detectors. The use of both the supervised network and the unsupervised network allows accurate detection of known logos in addition to being able to detect unknown logos.

System

Figure 7:
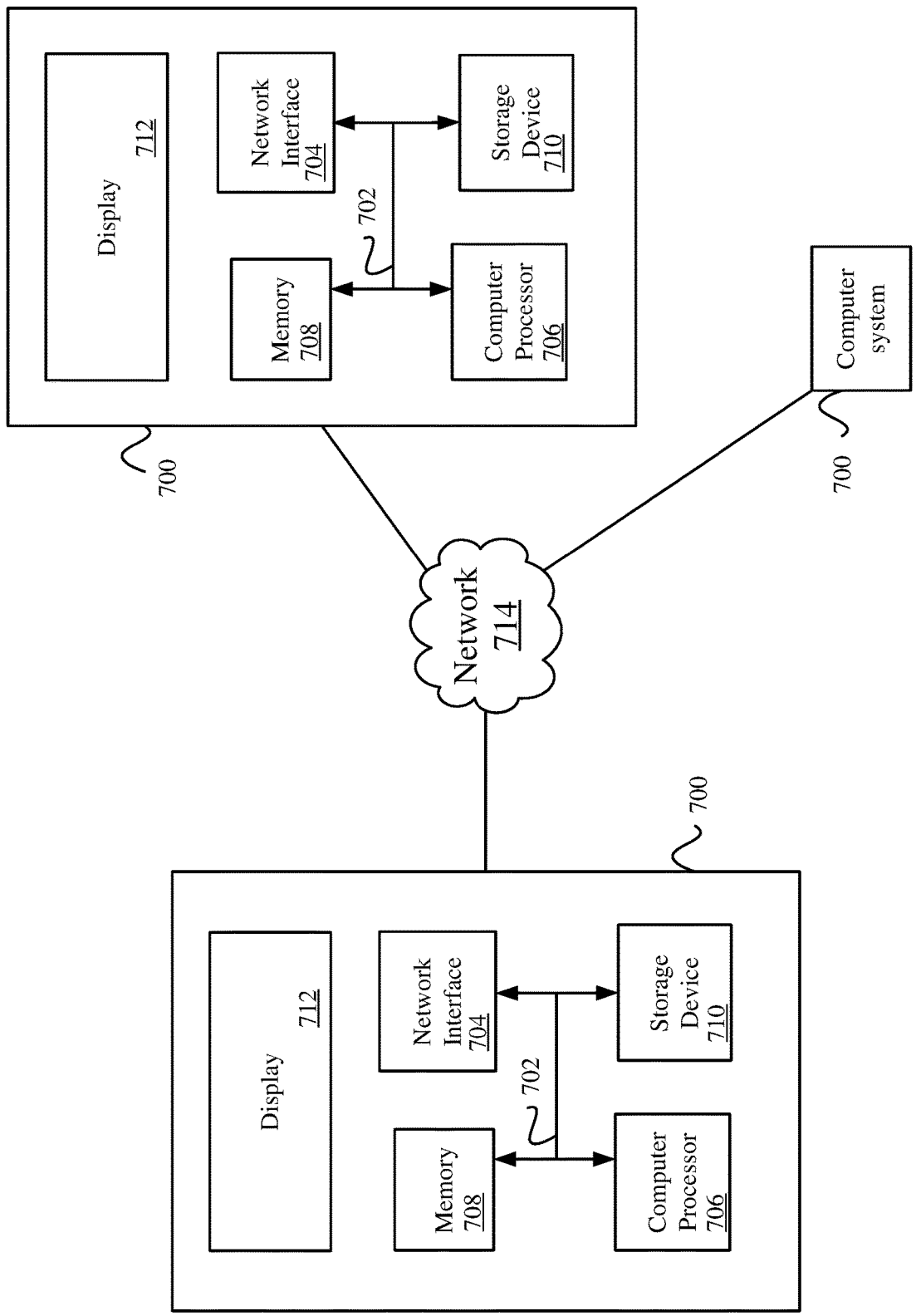
FIG. 7 illustrates an example of special purpose computer systems configured with a server system according to one embodiment.

FIG. 7 illustrates an example of special purpose computer systems 700 configured with server system 102 according to one embodiment. Computer system 700 includes a bus 702, network interface 704, a computer processor 706, a memory 708, a storage device 710, and a display 712.

Bus 702 may be a communication mechanism for communicating information. Computer processor 706 may execute computer programs stored in memory 708 or storage device 708. Any suitable programming language can be used to implement the routines of some embodiments including C, C++, Java, assembly language, etc. Different programming techniques can be employed such as procedural or object oriented. The routines can execute on a single computer system 700 or multiple computer systems 700. Further, multiple computer processors 706 may be used.

Memory 708 may store instructions, such as source code or binary code, for performing the techniques described above. Memory 708 may also be used for storing variables or other intermediate information during execution of instructions to be executed by processor 706. Examples of memory 708 include random access memory (RAM), read only memory (ROM), or both.

Storage device 710 may also store instructions, such as source code or binary code, for performing the techniques described above. Storage device 710 may additionally store data used and manipulated by computer processor 706. For example, storage device 710 may be a database that is accessed by computer system 700. Other examples of storage device 710 include random access memory (RAM), read only memory (ROM), a hard drive, a magnetic disk, an optical disk, a CD-ROM, a DVD, a flash memory, a USB memory card, or any other medium from which a computer can read.

Memory 708 or storage device 710 may be an example of a non-transitory computer-readable storage medium for use by or in connection with computer system 700. The non-transitory computer-readable storage medium contains instructions for controlling a computer system 700 to be configured to perform functions described by some embodiments. The instructions, when executed by one or more computer processors 706, may be configured to perform that which is described in some embodiments.

Computer system 700 includes a display 712 for displaying information to a computer user. Display 712 may display a user interface used by a user to interact with computer system 700.

Computer system 700 also includes a network interface 704 to provide data communication connection over a network, such as a local area network (LAN) or wide area network (WAN). Wireless networks may also be used. In any such implementation, network interface 704 sends and receives electrical, electromagnetic, or optical signals that carry digital data streams representing various types of information.

Computer system 700 can send and receive information through network interface 704 across a network 714, which may be an Intranet or the Internet. Computer system 700 may interact with other computer systems 700 through network 714. In some examples, client-server communications occur through network 714. Also, implementations of some embodiments may be distributed across computer systems 700 through network 714.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   generating, by a computing device using a first detector, a first output based on a first probability that an image was inserted in a video;
   generating, by the computing device using a second detector, a second output based on a second probability that an image was inserted in the video;
   analyzing, by the computing device, the first output from the first detector based on the first probability that the image was inserted in the video to determine whether the first output indicates whether the image is detected in the video;
   analyzing, by the computing device, the second output from the second detector based on the second probability that the image was inserted in the video to determine whether the second output indicates whether the image is detected in the video;
   when either of the first output or the second output determines that the image exists in the video, outputting, by the computing device, an indication that the image exists in the video; and
   when the first output and the second output determines that the image does not exist in the video, outputting, by the computing device, the indication that the image does not exist in the video to allow for another image to be inserted into the video.

2. The method of claim 1, further comprising:
   training the first detector by inputting the set of known images into the first detector; and
   adjusting one or more parameters in the first detector based on an output of the first detector, the one or more parameters used by the first detector to generate the first output.

3. The method of claim 1, further comprising:
   generating the set of known images for training of the first detector, wherein the set of known images are included in frames that have labels indicating whether respective frames include a known image in the set of known images.

4. The method of claim 3, wherein generating the set of known images comprises:
   receiving a known image;
   randomly altering the known image; and
   adding the randomly altered known image into a frame.

5. The method of claim 4, wherein randomly altering the known image is based on differences in appearance between the known image and an image in a frame of the video.

6. The method of claim 3, wherein generating the set of known images comprises:
   receiving a known image;
   receiving frame of a video;
   combining the known image into the frame of the video; and
   randomly altering the known image or the frame of the video.

7. The method of claim 1, wherein generating the second output using the second detector comprises:
   detecting edges in the video; and
   determining whether the image exists in the video based on the edges detected in the video.

8. The method of claim 7, wherein generating the second output using the second detector comprises:
   generating a representation that represents a number of the detected edges in an area;
   selecting areas of the video that may include an image; and
   determining whether each area includes the image based on a threshold.

9. The method of claim 8, wherein detecting the edges comprises:
   comparing the number of detected edges in a respective area to the threshold; and
   determining that at least one of the areas includes the image when the threshold is met.

10. The method of claim 1, wherein:
    analyzing the first output from the first detector comprises comparing the first probability from the first detector to a first threshold to calculate the first output; and
    analyzing the second output from the second detector comprises comparing the second probability from the second detector to a second threshold to calculate the second output.

11. The method of claim 10, wherein analyzing the first output from the first detector and analyzing the second output from the second detector comprises:
    when either of the first output meets the threshold or the second output meets the threshold, outputting the indication that the image exists in the video.

12. The method of claim 1, wherein:
    the first detector is trained with a set of known images to detect the set of known images, and
    the second detector is used to detect the set of unknown images without training.

13. A non-transitory computer-readable storage medium containing instructions, that when executed, control a computer system to be operable for:
    generating, using a first detector, a first output based on a first probability that an image was inserted in a video;
    generating, using a second detector, a second output based on a second probability that an image was inserted in the video;
    analyzing the first output from the first detector based on the first probability that the image was inserted in the video to determine whether the first output indicates whether the image is detected in the video;
    analyzing and the second output from the second detector based on the second probability that the image was inserted in the video to determine whether the second output indicates whether the image is detected in the video;
    when either of the first output or the second output determines that the image exists in the video, outputting an indication that the image exists in the video; and
    when the first output and the second output determines that the image does not exist in the video, outputting the indication that the image does not exist in the video to allow for another image to be inserted into the video.

14. The non-transitory computer-readable storage medium of claim 13, further configured for:
   training the first detector by inputting the set of known images into the first detector; and
   adjusting one or more parameters in the first detector based on an output of the first detector, the one or more parameters used by the first detector to generate the first output.

15. The non-transitory computer-readable storage medium of claim 13, further configured for:
   generating the set of known images for training of the first detector, wherein the set of known images are included in frames that have labels indicating whether respective frames include a known image in the set of known images.

16. The non-transitory computer-readable storage medium of claim 15, wherein generating the set of known images comprises:
   receiving a known image;
   randomly altering the known image; and
   adding the randomly altered known image into a frame.

17. The non-transitory computer-readable storage medium of claim 15, wherein generating the set of known images comprises:
   receiving a known image;
   receiving frame of a video;
   combining the known image into the frame of the video; and
   randomly altering the known image or the frame of the video.

18. The non-transitory computer-readable storage medium of claim 13, wherein generating the second output using the second detector comprises:
   detecting edges in the video; and
   determining whether the image exists in the video based on the edges detected in the video.

19. The non-transitory computer-readable storage medium of claim 13, wherein:
   the first detector is trained with a set of known images to detect the set of known images, and
   the second detector is used to detect the set of unknown images without training.

20. An apparatus comprising:
   one or more computer processors; and
   a non-transitory computer-readable storage medium comprising instructions, that when executed, control the one or more computer processors to be operable for:
   generating, using a first detector, a first output based on a first probability that an image was inserted in a video;
   generating, using a second detector, a second output based on a second probability that an image was inserted in the video;
   analyzing the first output from the first detector based on the first probability that the image was inserted in the video to determine whether the first output indicates whether the image is detected in the video;
   analyzing the second output from the second detector based on the second probability that the image was inserted in the video to determine whether the second output indicates whether the image is detected in the video;
   when either of the first output or the second output determines that the image exists in the video, outputting an indication that the image exists in the video; and
   when the first output and the second output determines that the image does not exist in the video, outputting the indication that the image does not exist in the video to allow for another image to be inserted into the video.

* * * * *